(12) United States Patent
Murayama et al.

(10) Patent No.: US 9,643,585 B2
(45) Date of Patent: May 9, 2017

(54) STROKE SIMULATOR

(71) Applicants: HONDA MOTOR CO., LTD., Minato-ku, Tokyo (JP); NISSIN KOGYO CO., LTD., Ueda-shi, Nagano (JP)

(72) Inventors: Kazuaki Murayama, Wako (JP); Takaaki Ohnishi, Wako (JP); Kazuhiro Tagata, Ueda (JP)

(73) Assignees: Honda Motor Co., Ltd., Tokyo (JP); Autoliv Nissin Brake Systems Japan Co., Ltd., Nagano (JP)

( * ) Notice: Subject to any disclaimer, the term of this patent is extended or adjusted under 35 U.S.C. 154(b) by 217 days.

(21) Appl. No.: 14/388,882

(22) PCT Filed: Mar. 29, 2013

(86) PCT No.: PCT/JP2013/059712
§ 371 (c)(1),
(2) Date: Sep. 29, 2014

(87) PCT Pub. No.: WO2013/147245
PCT Pub. Date: Oct. 3, 2013

(65) Prior Publication Data
US 2015/0040557 A1 Feb. 12, 2015

(30) Foreign Application Priority Data
Mar. 30, 2012 (JP) .................................. 2012-083320

(51) Int. Cl.
*B60T 13/138* (2006.01)
*B60T 13/74* (2006.01)
(Continued)

(52) U.S. Cl.
CPC ............ *B60T 13/745* (2013.01); *B60T 7/042* (2013.01); *B60T 8/368* (2013.01); *B60T 8/409* (2013.01);
(Continued)

(58) Field of Classification Search
CPC ............................... B60T 8/4086; B60T 8/409
See application file for complete search history.

(56) References Cited

U.S. PATENT DOCUMENTS 8,010,269 B2   8/2011   Toyohira et al.
8,661,812 B2 *  3/2014   Ganzel .................... B60T 7/042
                                                           60/554

(Continued)

FOREIGN PATENT DOCUMENTS

CN           1899899 A      1/2007
CN         102015389 A      4/2011
(Continued)

OTHER PUBLICATIONS

Extended European Search Report issued on Dec. 10, 2015 in the corresponding European Patent Application No. 13769157.2.
(Continued)

*Primary Examiner* — Michael Leslie
(74) *Attorney, Agent, or Firm* — Carrier Blackman & Associates, P.C.; Joseph P. Carrier; Fulchand P. Shende

(57) ABSTRACT

Provided is a stroke simulator capable of suppressing occurrence of inclination of a piston with respect to a sliding surface formed in a cylinder. The stroke simulator includes a simulator piston which is displaced by sliding on a sliding surface formed in a first cylinder, and a first return spring which is housed in the first cylinder and applies, to the simulator piston, a reaction force which is generated by an elastic deformation of the spring under a pressing force due to a displacement of the simulator piston, and generates the reaction force which is applied to the simulator piston as a brake reaction force for a brake operating element. The
(Continued)

stroke simulator is characterized in that a cup seal for sealing a gap formed between the sliding surface and the simulator piston is mounted in the middle in the axial direction of the sliding surface.

1 Claim, 6 Drawing Sheets

(51) Int. Cl.
*F16J 1/04* (2006.01)
*B60T 7/04* (2006.01)
*B60T 13/66* (2006.01)
*B60T 15/36* (2006.01)
*B60T 8/36* (2006.01)
*B60T 8/40* (2006.01)
*B60T 13/16* (2006.01)
*B60T 13/14* (2006.01)

(52) U.S. Cl.
CPC .......... *B60T 8/4086* (2013.01); *B60T 13/146* (2013.01); *B60T 13/162* (2013.01); *B60T 13/662* (2013.01); *B60T 15/36* (2013.01); *F16J 1/04* (2013.01)

(56) References Cited

U.S. PATENT DOCUMENTS

| | | | |
|---|---|---|---|
| 8,662,601 B2 | 3/2014 | Nakazawa | |
| 8,850,810 B2 * | 10/2014 | Murayama | B60T 7/042 60/553 |
| 9,016,805 B2 | 4/2015 | Ganzel | |
| 2005/0110341 A1 | 5/2005 | Kusano | |
| 2010/0295365 A1 | 11/2010 | Nimura | |
| 2011/0185723 A1 * | 8/2011 | Ganzel | B60T 7/042 60/547.1 |
| 2014/0144732 A1 | 5/2014 | Bayer et al. | |

FOREIGN PATENT DOCUMENTS

| | | |
|---|---|---|
| CN | 102307765 A | 1/2012 |
| EP | 2127972 A1 | 12/2009 |
| JP | 2009-090932 A | 4/2009 |
| JP | 2009-227172 A | 10/2009 |
| JP | 2010-254261 A | 11/2010 |
| JP | 2011-126536 A | 6/2011 |
| JP | 2012-106642 A | 6/2012 |
| WO | 2012/150108 A1 | 11/2012 |

OTHER PUBLICATIONS

Office Action issued on Jan. 5, 2016 in the corresponding Chinese Patent Application No. 201380018105.3.
Office Action dated Sep. 7, 2016, communication pursuant to Article 94(3) EPC, issued in the corresponding European Patent Application 13 769 157.2.

* cited by examiner

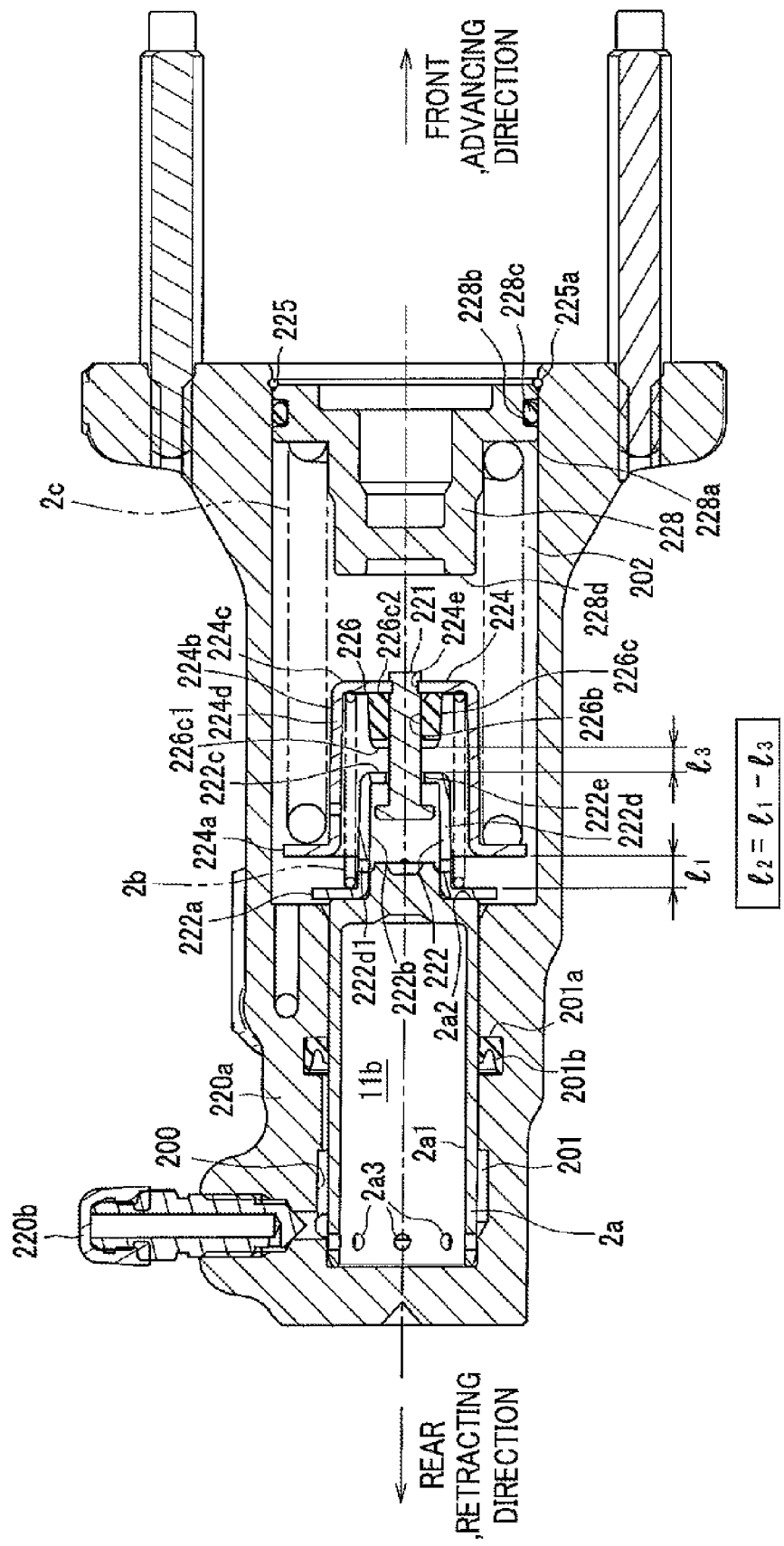

STROKE SIMULATOR

TECHNICAL FIELD

The present invention relates to a stroke simulator for generating a brake reaction force to be applied to a brake pedal of a braking device.

BACKGROUND ART

There has been well known a braking device (electric braking device) having an electric motor as a driving source of a servo unit for boosting a pedal effort when a brake pedal is depressed. Such an electric braking device is provided with a stroke simulator generating a pseudo-brake reaction force to the brake pedal which is depressed by a driver. For example, in Patent Document 1, there is disclosed a stroke simulator, that includes a piston to be displaced due to a hydraulic pressure generated by a depression operation of the brake pedal, and generates as the brake reaction force a reaction force occurring in a first spring and a second spring which are elastically deformed by a depression force due to a displacement of the piston.

CITATION LIST

Patent Literature

{Patent Document 1}
Japanese Patent Application Publication No. 2009-227172

SUMMARY OF INVENTION

Technical Problem

The piston of the stroke simulator disclosed in Patent Document 1 is configured to be in sliding contact with an inner wall surface of a hole, and to be displaced by sliding on this surface as a sliding surface. However, since a small gap is formed between the piston and the sliding surface of the hole, the piston is inclined with respect to the hole owing to the gap in some cases. If the piston is inclined, a sliding friction with the sliding surface becomes large, and thus there is a possibility that an operation feeling of the brake pedal is changed.

Therefore, a purpose of the present invention is to provide a stroke simulator capable of suppressing occurrence of inclination of the piston with respect to a sliding surface formed in a cylinder.

Solution to Problem

In order to solve the above problem, the present invention provides a stroke simulator including a simulator piston which is displaced by sliding on a sliding surface formed in a first cylinder, in response to a hydraulic pressure which is generated by a hydraulic pressure generating unit due to an operation of a brake operating element by a driver, and a reaction force generating unit which applies a reaction force corresponding to a displacement of the simulator piston to the simulator piston, the stroke simulator generating the reaction force which is applied to the simulator piston as a brake reaction force for the brake operating element. The sliding surface is formed in a part of the first cylinder, wherein the stroke simulator includes a second cylinder, which is coaxially formed in communication with the first cylinder and houses the reaction force generating unit therein, and wherein a cup seal is attached to a gap formed between the simulator piston and the sliding surface in the middle in the axial direction of the sliding surface.

According to this invention, it is possible to suppress inclination of the simulator piston because the cup seal is attached to the axial center of the sliding surface of the first cylinder.

Further, the present invention is characterized in that the cup seal has an annular shape including an outer peripheral portion which is fitted into a mounting groove formed in the sliding surface, and an inner peripheral portion which is in sliding contact with an outer peripheral surface of the simulator piston, wherein the inner peripheral portion is deformed in response to the hydraulic pressure in the first cylinder and the second cylinder, and wherein the inner peripheral portion comes into contact with the simulator piston in the middle in the axial direction of the sliding surface, when the simulator piston is displaced to a defined position.

According to this invention, it can be configured that the cup seal and the simulator piston are in sliding contact with each other at the axial center of the sliding surface, when the cup seal of a shape in sliding contact with the simulator piston at the inner peripheral portion thereof is deformed by dragging by the simulator piston which is displaced to the defined position toward the second cylinder. With this configuration, it is possible to suppress inclination of the simulator piston which is displaced to the defined position toward the second cylinder in which the reaction force generating unit is housed.

Advantageous Effects of Invention

According to the present invention, it is possible to provide a stroke simulator capable of suppressing occurrence of inclination of the piston with respect to the sliding surface formed in the cylinder.

BRIEF DESCRIPTION OF DRAWINGS

FIG. 4 is a sectional view showing a schematic configuration of the stroke simulator;

DESCRIPTION OF EMBODIMENTS

Figure 1:
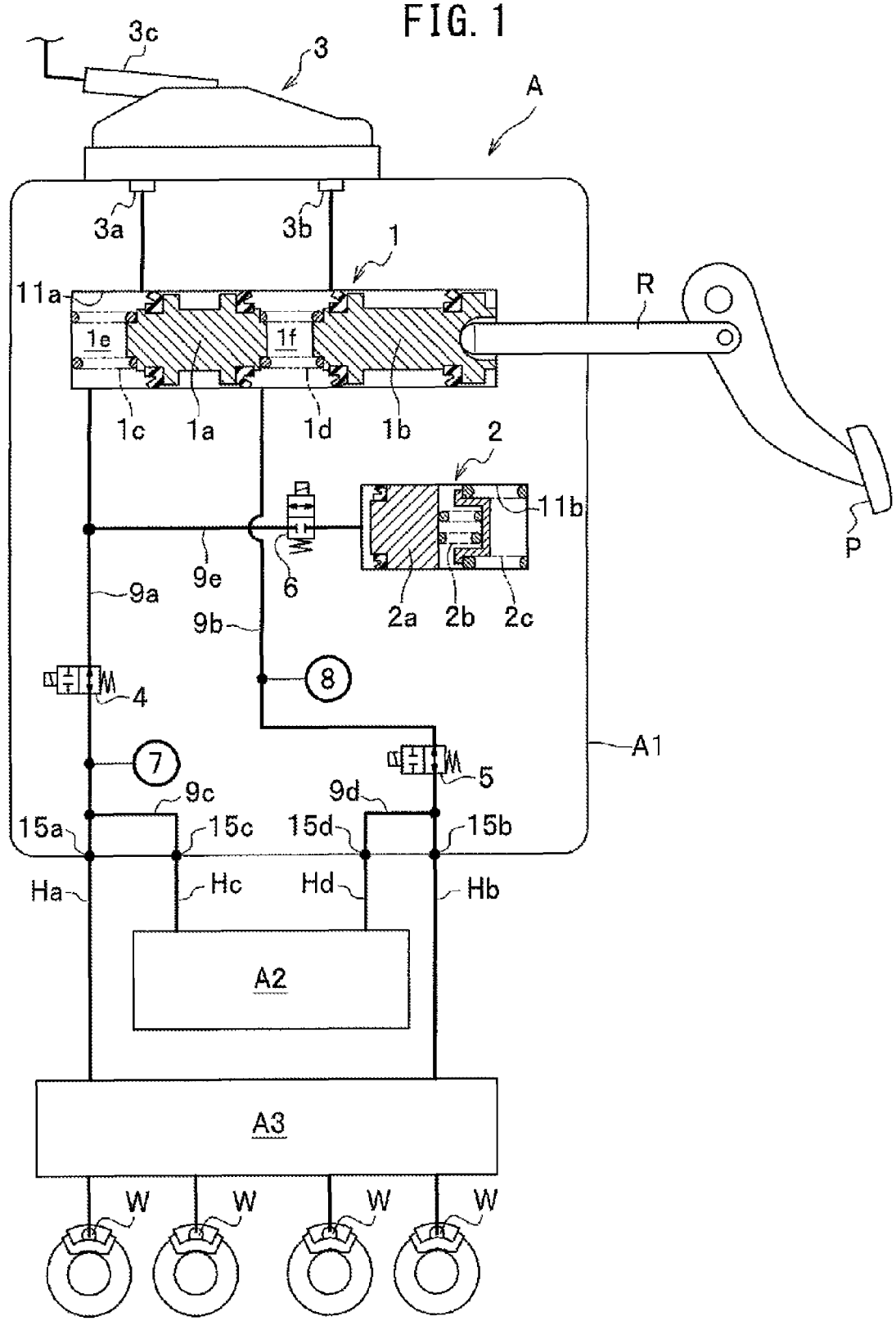
FIG. 1 is a schematic diagram of a vehicle brake system including a stroke simulator according to an embodiment of the present invention.

Hereinafter, embodiments of the present invention will be described in detail with appropriate reference to accompanying drawings. FIG. 1 is a schematic diagram of a vehicle brake system according to an embodiment of the present invention. A vehicle brake system A shown in FIG. 1 includes both of a by-wire (By Wire) type brake system operating during operation of a prime mover (an engine, a motor, or the like) and a hydraulic type brake system operating in case of emergency, shutdown of the prime mover, or the like. Further, the vehicle brake system A includes a master cylinder device A1 for generating a brake hydraulic pressure by a depression force when a brake pedal (brake operating element) P is depressed, a motor cylinder device A2 for generating the brake hydraulic pressure by utilizing an electric motor (not shown), and a vehicle stability assist device A3 (hereinafter, referred to as a "hydraulic pressure control device A3") for assisting stabilization of vehicle behavior. The master cylinder device A1, the motor cylinder device A2, and the hydraulic pressure control device A3 are configured as separated units, to be in communication with one another via an external piping.

In addition to an automobile with only an engine (internal combustion engine) as a power source, the vehicle brake system A can be also mounted on a hybrid vehicle using a combination of motor and an engine, an electric vehicle or a fuel cell electric vehicle with only a motor as the power source, or the like.

The master cylinder device (input device) A1 includes a master cylinder 1, a stroke simulator 2, a reservoir 3, normally open type shut-off valves (solenoid valves) 4, 5, a normally closed type shut-off valve (solenoid valve) 6, pressure sensors 7, 8, main hydraulic paths 9a, 9b, contact hydraulic paths 9c, 9d, and a branch hydraulic path 9e.

The master cylinder 1 is a hydraulic pressure generating unit that generates a hydraulic pressure by converting the depression force when the brake pedal P is depressed, to the brake hydraulic pressure. Further, the master cylinder 1 includes a first piston 1a which is disposed on a bottom wall side of a first cylinder bore 11a, a second piston 1b which is connected to a push rod R, a first return spring 1c which is disposed between the first piston and the bottom wall of the first cylinder bore 11a, and a second return spring 1d which is disposed between the two pistons 1a and 1b. The second piston 1b is connected to the brake pedal P via the push rod R. The two pistons 1a, 1b slide (are displaced) upon receiving the depression force of the brake pedal P, and pressurize a brake fluid in pressure chambers 1e, 1f. The pressure chambers 1e, 1f communicate with the main hydraulic path 9a, 9b, respectively.

The stroke simulator 2 is a device that generates and applies a pseudo-operation reaction force (brake reaction force) to the brake pedal P, and includes a simulator piston 2a which is displaced by sliding in a second cylinder bore 11b, and two large and small return springs (a first return spring 2b, a second return spring 2c) which urge the simulator piston 2a. The stroke simulator 2 communicates with the pressure chamber 1e via the branch hydraulic path 9e and the main hydraulic path 9a, and operates by the brake hydraulic pressure generated in the pressure chamber 1e. Details of the stroke simulator 2 will be described later.

The reservoir 3 is a container for reserving the brake fluid, and includes oil supply ports 3a, 3b connected to the master cylinder 1, and a pipe connection port 3c to which a hose extending from a main reservoir (not shown) is connected.

The normally open type shut-off valves 4, 5 are for opening or closing the main hydraulic paths 9a, 9b, and both are made of normally open type solenoid valves. One normally open type shut-off valve 4 opens or closes the main hydraulic path 9a in a section from an intersection of the main hydraulic path 9a with the branch hydraulic path 9e to an intersection of the main hydraulic path 9a with the contact hydraulic path 9c. The other normally open type shut-off valve 5 opens or closes the main hydraulic path 9b on an upstream side of an intersection of the main hydraulic path 9b with the contact hydraulic path 9d.

The normally closed type shut-off valve 6 is for opening or closing the branch hydraulic path 9e, and is made of a normally closed type solenoid valve.

The pressure sensors 7, 8 are for detecting a magnitude of the brake hydraulic pressure, and are mounted in sensor mounting holes (not shown) communicating with the main hydraulic paths 9a, 9b. One pressure sensor 7 is disposed on a downstream side of the normally open type shut-off valve 4, and detects the brake hydraulic pressure generated in the motor cylinder device A2 when the normally open type shut-off valve 4 is in a closed state (a state in which the main hydraulic path 9a is shut off). The other pressure sensor 8 is disposed on an upstream side of the normally open type shut-off valve 5, and detects the brake hydraulic pressure generated in the master cylinder 1 when the normally open type shut-off valve 5 is in a closed state (a state in which the main hydraulic path 9b is shut off). Information obtained by the pressure sensors 7, 8 is outputted to an electronic control unit (ECU, not shown).

The main hydraulic paths 9a, 9b are hydraulic paths originating from the master cylinder 1. To output ports 15a, 15b, which are endpoints of the main hydraulic paths 9a, 9b, pipe materials Ha, Hb leading to the hydraulic pressure control device A3 are connected.

The contact hydraulic paths 9c, 9d are hydraulic paths leading to the main hydraulic paths 9a, 9b from input ports 15c, 15d. To the input ports 15c, 15d, pipe materials Hc, Hd leading to the motor cylinder device A2 are connected.

The branch hydraulic path 9e is a hydraulic path which is branched from one main hydraulic path 9a and leads to the stroke simulator 2.

The master cylinder device A1 communicates with the hydraulic pressure control device A3 via the pipe materials Ha, Hb, and when the normally open type shut-off valves 4, 5 are in an open valve state, the brake hydraulic pressure generated in the master cylinder 1 is inputted to the hydraulic pressure control device A3 via the main hydraulic pressure paths 9a, 9b and pipe members Ha, Hb.

Although not shown, the motor cylinder device A2 includes a slave piston which slides in a slave cylinder, an actuator mechanism having an electric motor and a driving force transmission unit, and a reservoir for reserving the brake fluid in the slave cylinder. The electric motor operates in response to signals from an electronic control unit (not shown). The driving force transmission unit transmits a rotational power to the slave piston after converting the rotational power to a reciprocating motion. The slave piston slides in the slave cylinder upon receiving a driving force of the electric motor, and pressurizes the brake fluid in the slave cylinder. The brake hydraulic pressure generated in the motor cylinder device A2 is inputted to the master cylinder device A1 via the pipe members Hc, Hd, and inputted to the hydraulic pressure control device A3 via the contact hydraulic paths 9c, 9d, and the pipe members Ha, Hb. To the reservoir, a hose extending from the main reservoir (not shown) is connected.

The hydraulic pressure control device A3 is provided with a structure capable of performing an anti-lock brake control (ABS control) for suppressing wheel slip, a traction control, a sideslip control for stabilizing a behavior of a vehicle, or the like, and is connected to wheel cylinders W, W, —via pipe materials. In addition, although not shown, the hydraulic pressure control device A3 includes, for example, a hydraulic unit provided with a solenoid valve, a pump, and the like, a motor for driving the pump, and an electronic control unit for controlling the solenoid valve, the motor, and the like.

Next, operation of the vehicle brake system A will be schematically described. During normal time in which the vehicle brake system A functions properly, the normally open type shut-off valves 4, 5 are in a closed valve state, and the normally closed type shut-off valve 6 is in an open valve state. When the driver depresses the brake pedal P in such a state, the brake hydraulic pressure generated in the master cylinder 1 is not transmitted to the wheel cylinder W but to the stroke simulator 2. Then, by the simulator piston 2a being displaced, the brake pedal P is allowed to be depressed, and a reaction force, which is applied to the simulator piston 2a from an elastic member deforming elastically by a displacement of the simulator piston 2a, is generated as a pseudo-brake reaction force, to be applied to the brake pedal P.

Further, when a depression of the brake pedal P is detected by a stroke sensor, or the like (not shown), the electric motor of the motor cylinder device A2 is driven, and the brake fluid in the cylinder is pressurized by the slave piston being displaced. The electronic control unit (not shown) compares the brake hydraulic pressure (the brake hydraulic pressure detected by the pressure sensor 7) outputted from the motor cylinder device A2 with the brake hydraulic pressure (the brake hydraulic pressure detected by the pressure sensor 8) outputted from the master cylinder 1, and controls a number of revolutions or the like of the electric motor on the basis of a comparison result.

The brake hydraulic pressure generated in the motor cylinder device A2 is transmitted to the wheel cylinders W, W, —via the hydraulic pressure control device A3, and a braking force is applied to each wheel by each wheel cylinder W being operated.

In addition, in a situation where the motor cylinder device A2 does not work (for example, emergency or if power is not obtained), since the normally open type shut-off valves 4, 5 are both in the open valve state and the normally closed type shut-off valve 6 is in the closed valve state, the brake hydraulic pressure generated in the master cylinder 1 is transmitted to the wheel cylinders W, W, —.

Next, a specific structure of the master cylinder device A1 will be described. The master cylinder device A1 of the present embodiment is formed by assembling the above various components to the interior or the exterior of a base body 10 in FIGS. 2A, 2B, and by covering electric components (the normally open type shut-off valves 4, 5, the normally closed type shut-off valve 6, and the pressure sensors 7, 8 (see FIG. 1)) with a housing 20. Note that, mechanical components or the like may be housed in the housing 20.

The base body 10 is a cast product made of aluminum alloy, and includes a cylinder portion 11 (see FIG. 2B, the same below), a vehicle body fixing portion 12, a reservoir mounting portion 13 (see FIG. 2B, the same below), a housing mounting portion 14, and a pipe connecting portion 15. Further, in the interior of the base body 10, holes (not shown) which are the main hydraulic paths 9a, 9b (see FIG. 1), the branch hydraulic path 9e (see FIG. 1), and the like are formed.

Figure 2A:
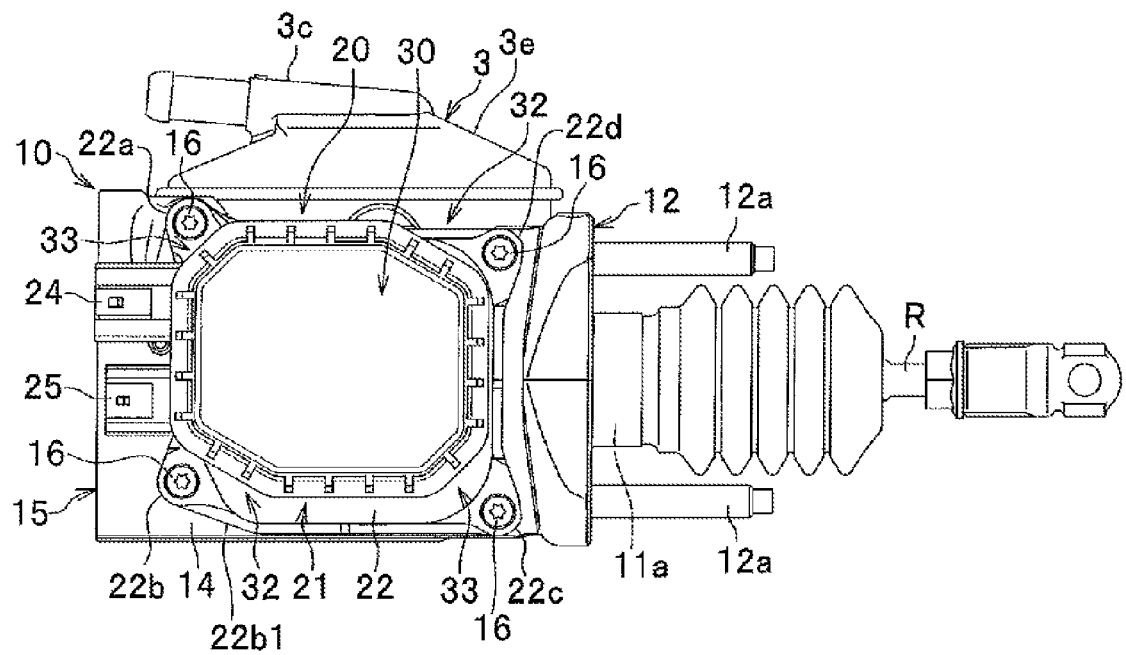
FIG. 2A is a side view of a master cylinder device.
Figure 2B:
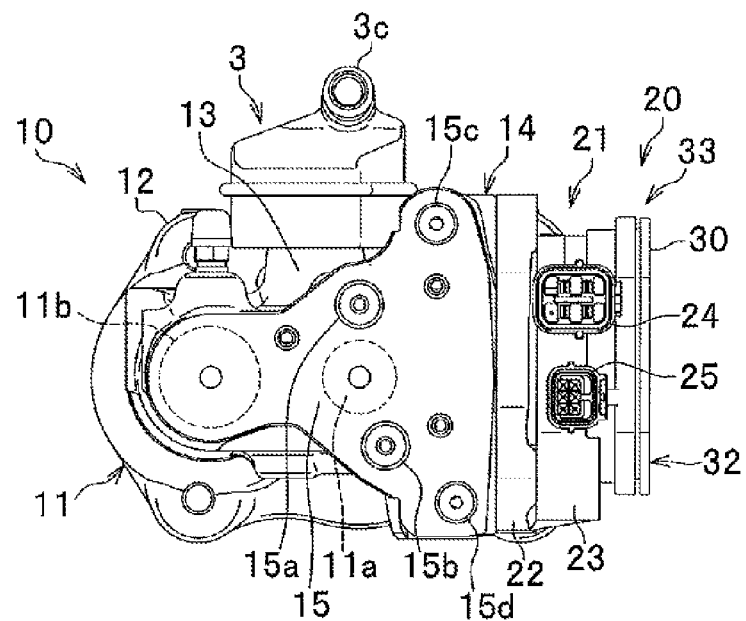
FIG. 2B is a front view of the master cylinder device.

The cylinder portion 11 is formed with a first cylinder bore 11a for the master cylinder, and a second cylinder bore 11b for the stroke simulator (both are shown in dashed lines in FIG. 2B). Both cylinder bores 11a, 11b are bottomed cylindrical shape, and are open to the vehicle body fixing portion 12 while extending toward the pipe connecting portion 15. To the first cylinder bore 11a, components (the first piston 1a, the second piston 1b, the first return spring 1c, and the second return spring 1d) constituting the master cylinder 1 (see FIG. 1) are inserted, and to the second cylinder bore 11b, components (the simulator piston 2a, and the first and second return springs 2b, 2c) constituting the stroke simulator 2 are inserted.

The vehicle body fixing portion 12 is fixed to a vehicle body side fixing portion such as a toe board (not shown). The vehicle body fixing portion 12 is formed in a rear surface portion of the base body 10, and has a flange shape. In a peripheral edge portion (a portion projecting from the cylinder portion 11) of the vehicle body fixing portion 12, bolt insertion holes (not shown) are formed, and bolts 12a are fixed thereto.

As shown in FIG. 2B, the reservoir mounting portion 13 is a portion to be a mounting seat of the reservoir 3, and two (only one is shown) are formed in an upper surface portion of the base body 10. In the reservoir mounting portion 13, a reservoir union port is provided. Note that, the reservoir 3 is fixed to the base body 10 via a connection portion (not shown) projected from an upper surface of the base body 10. The reservoir union port has a cylindrical shape, and communicates with the first cylinder bore 11a via a hole extending toward the first cylinder bore 11a from a bottom surface thereof. To the reservoir union port, a fluid supply port (not shown) projected from a lower portion of the reservoir 3 is connected, and on an upper end of the reservoir union port, a container body of the reservoir 3 is placed.

On the side surface of the base body 10, the housing mounting portion 14 is provided. The housing mounting portion 14 is a portion to be a mounting seat of the housing 20. The housing mounting portion 14 has a flange shape. In an upper end portion and a lower end portion of the housing mounting portion 14, female screws (not shown) are formed, and as shown in FIG. 2A, by screwing mounting screws 16 to the female screws, the housing 20 is adapted to be fixed to the housing mounting portion 14 (the side surface of the base body 10).

Although not shown, in the housing mounting portion 14, three valve mounting holes and two sensor mounting holes are formed. To the three valve mounting holes, the normally open type shut-off valves 4, 5, and the normally closed type shut-off valve 6 (see FIG. 1) are assembled, and to the two sensor mounting holes, the pressure sensors 7, 8 (see FIG. 1) are assembled.

The pipe connecting portion 15 is a portion to be a pipe mounting seat, and is formed on a front surface portion of the base body 10 as shown in FIG. 2A. To the pipe connecting portion 15, as shown in FIG. 2B, the two output ports 15a, 15b and the two input ports 15c, 15d are formed. To the output ports 15a, 15b, the pipe materials Ha, Hb (see FIG. 1) leading to the hydraulic pressure control device A3 (see FIG. 1) are connected, and to the input ports 15c, 15d, the pipe materials Hc, Hd (see FIG. 1) leading to the motor cylinder device A2 (see FIG. 1) are connected.

Figure 3:
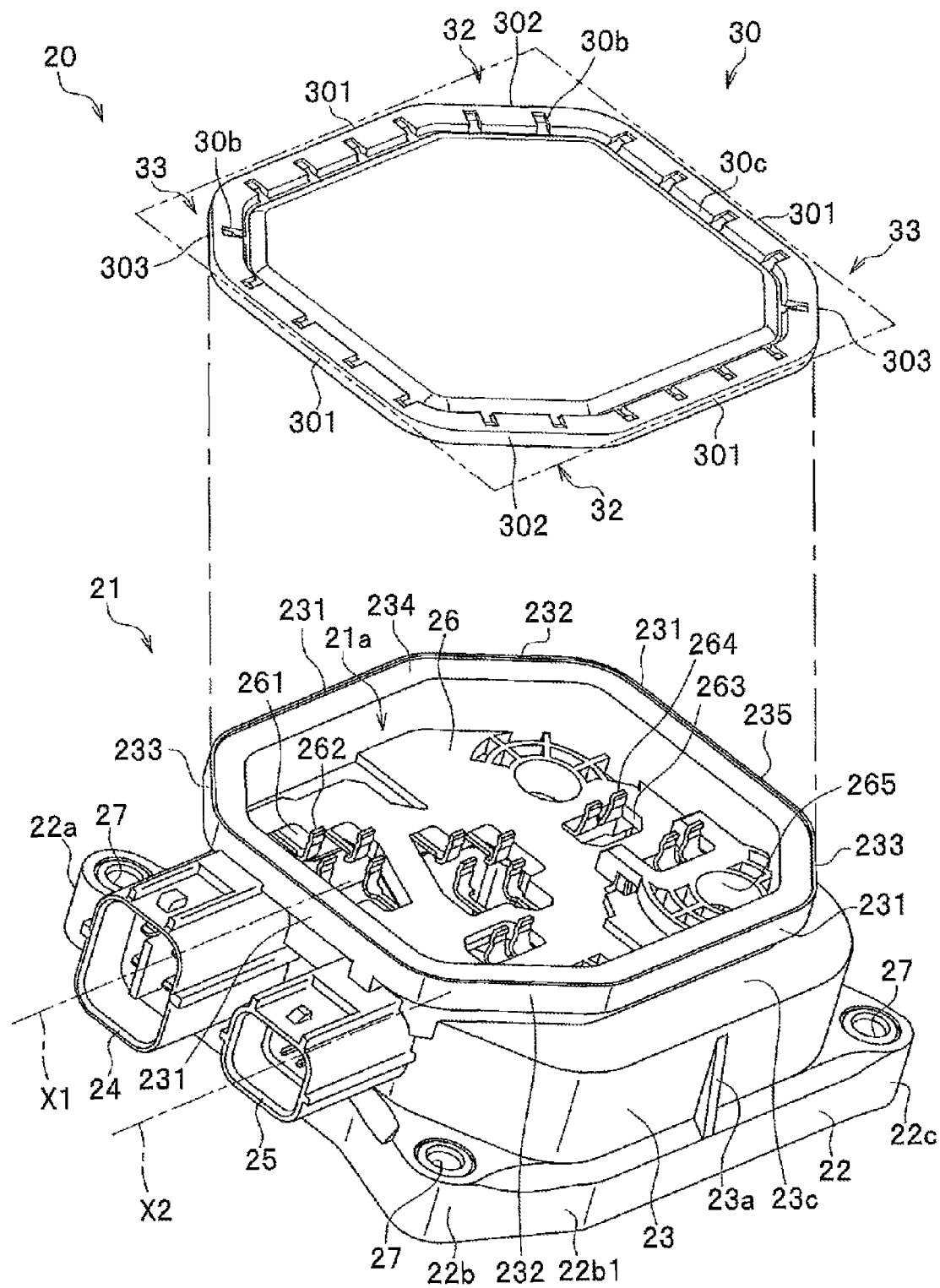
FIG. 3 is an exploded perspective view of a housing.

The housing 20 includes a housing body 21 which covers in a liquid-tight manner the components (the normally open type shut-off valves 4, 5, the normally closed type shut-off valve 6, and the pressure sensors 7, 8, see FIG. 1, the same below) assembled to the housing mounting portion 14, and a lid member 30 which is attached to an opening 21a (see FIG. 3) of the housing body 21. As shown in FIG. 3, the housing body 21 includes a flange portion 22, a peripheral wall portion 23 erected on the flange portion 22, and two connectors 24, 25 as connecter portions projected from a peripheral wall surface of the peripheral wall portion 23.

In the inside of the peripheral wall portion 23 of the housing body 21, although not shown, an electromagnetic coil for driving the normally open type shut-off valves 4, 5 (see FIG. 1) and the normally closed type shut-off valve 6 (see FIG. 1) is housed, and a bus bar leading to the electromagnetic coil and the pressure sensors 7, 8 (see FIG. 1) and the like are also housed. Further, the flange portion 22 is a portion which is crimped to the housing mounting portion 14 (see FIG. 2B, the same below). The flange portion 22 is formed to project to the outside of the housing body 21 so as to be continuous with boss portions 22a to 22d as mounting screw portions.

Each of the boss portions 22a to 22d is provided at four corners of the housing body 21 in accordance with a position of the female screw of the housing mounting portion 14. In each of the boss portions 22a to 22d, a collar made of metal is embedded, and in the inside thereof, a screw insertion hole 27 (screw hole) functioning as an insertion hole is formed. In the screw insertion holes 27, the mounting screws 16 (see FIG. 2A, the same below) as fastening members are respectively inserted. When fixing the housing 20 to the housing mounting portion 14 of the base body 10 (see FIG. 2A), it can be performed by evenly fastening each of the mounting screws 16.

As shown in FIG. 3, out of the flange portion 22, a flange portion 22b1 continuing to the boss portion 22b has an inclined shape at a lower surface thereof. An inclination of the flange portion 22b is adapted to correspond to an inclination of a first inclined edge portion 232 to be described later of the peripheral wall portion 23. Thus, space saving is achieved.

In addition, in a surface opposing the housing mounting portion 14 of the flange portion 22, a circumferential groove (not shown) is formed, and to the circumferential groove, a seal member of synthetic rubber is attached. The seal member is in close contact with the housing mounting portion 14 by fastening of the mounting screw 16, and serves to hold liquid-tightness of the housing body 21.

On an outer peripheral surface of the peripheral wall portion 23, a rib 23a is provided at a suitable place. As shown in FIG. 3, the rib 23 is formed across to the flange portion 22 from the peripheral wall portion 23.

In the inside of the peripheral wall portion 23, as shown in FIG. 3, a partition wall 26 is formed. In the partition wall 26, sensor connection holes 261 to which the pressure sensors 7, 8 (see FIG. 1) are connected, coil connection holes 263, and solenoid valve insertion holes (insertion holes for the normally open type shut-off valves 4, 5, and the normally closed type shut-off valve 6) 265 are formed. In the sensor connection hole 261 and the coil connection hole 263, terminals 262, 264 are respectively disposed.

As shown in FIG. 3, the lid member 30 is attached to an opening edge 234 of the peripheral wall portion 23. The lid member 30 is fixed to the opening edge 234 by an adhesive means such as an adhesive, an ultrasonic welding, or the like. The opening edge 234 is formed in a shape corresponding to an outer shape of the lid member 30.

As shown in FIG. 3, the lid member 30 is formed in an octagonal outside shape, and is formed in a point symmetric shape with respect to a center corresponding to a center of the opening 21a of the peripheral wall portion 23. The lid member 30 has an outer shape inscribed in a quadrangle (rectangle shown in a two-dot chain line) which is formed with two sets of two opposing sides. The lid member 30 has a pair of first cut portions 32, 32 which is formed by missing one pair of opposing corners out of two pair of opposing corners of the quadrangle by the same size, and a pair of second cut portions 33, 33 which is formed by missing the other pair of opposing corners by the same size. All of the first cut portions 32, 32 and the second cut portions 33, 33 have a triangular shape.

The lid member 30 includes straight edges 301 along sides of the quadrangle, first inclined edges 302, 302 facing the first cut portions 32, 32, and second inclined edges 303, 303 facing the second cut portions 33, 33.

The straight edges 301 are formed four in accordance with four sides of the quadrangle, and all of them have the same length. Two opposing sides of the straight edges 301 are parallel to each other. The first inclined edges 302, 302 connect the adjacent straight edges 301, 301 to each other, and are parallel to each other. The second inclined edges 303, 303 connect the adjacent straight edges 301, 301 to each other, and are parallel to each other.

The first cut portions 32, 32 have areas (amounts of cut) larger than that of the second cut portions 33, 33, and as shown in FIG. 2A, they are arranged such that, on the side of the base body 10, one first cut portion 32 is positioned at a front side lower portion of the base body 10, and the other first cut portion 32 is positioned at a rear side upper portion of the base body 10. Here, the master cylinder device A1 is arranged such that the front side of the base body 10 is mounted toward the front side of the vehicle in an engine room, and thus one first inclined edge 302 is formed at the front side lower portion of the base body 10. In other words, one first inclined edge 302 is adapted to be disposed toward a space in which a structure or a peripheral device M is easily present.

The second cut portions 33, 33 have areas (amounts of cut) smaller than that of the first cut portions 32, 32, and as shown in FIG. 2A, they are arranged such that, on the side of the base body 10, one second cut portion 33 is positioned at a front side upper portion of the base body 10, and the other second cut portion 33 is positioned at a rear side lower portion of the base body 10. In the second cut portion 33 of the front side upper portion, a part of the screw insertion hole 27 of the boss portion 22a is positioned in a side view. In other words, the screw insertion hole 27 is formed close to the second inclined edge 303 (peripheral wall portion 23) by using one second cut portion 33. Note that, the center of the screw insertion hole 27 is preferably positioned in the second cut portion 33 of the front side upper portion, and more preferably, the whole of the screw insertion hole 27 is positioned in the second cut portion 33.

In addition, as shown in FIG. 2A, in the first cut portion 32 of the front side lower portion, the whole of the screw insertion hole 27 of the boss portion 22b is positioned.

In peripheral edges of a surface of the lid member 30, a plurality of recesses 30b are formed at intervals in the circumferential direction. Here, the number of the recesses 30b formed in a first inclined edge 302 is two, and the number of the recesses 30b formed in a second inclined edge 303 is one. In other words, the number of the recesses 30b provided in the peripheral edge facing the first cut portion 32 is larger than the number of the recesses 30b provided in the peripheral edge facing the second cut portion 33. In addition, in the four straight edges 301, four recesses 30b are provided respectively.

In the inside of the peripheral edge of the lid member 30, a circumferential groove 30c is formed. In addition, the circumferential groove 30c and each recess 30b are in communication with each other.

As shown in FIG. 3, the opening edge 234 of the peripheral wall portion 23 of the housing body 21 is formed in a shape corresponding to the outer shape of the lid member 30, and includes four straight edge portions 231, and the first inclined edge portions 232, 232 and second inclined edge portions 233, 233 which connect the adjacent straight edge portions 231, 231 to each other. The four straight edge portions 231 respectively correspond to the straight edges 301 of the lid member 30, and the first inclined edge portions 232, 232 correspond to the first inclined edges 302, 302 of the lid member 30, and further the second inclined edge portions 233, 233 correspond to the second inclined edges 303, 303 of the lid member 30. The opening edge 234 is formed in a flat surface, and a welding portion formed on a rear surface of the lid member 30 comes into contact with the flat surface, to be welded. In addition, at an outer peripheral edge of the opening edge 234, a circumferential rib 235 is formed.

Such a peripheral wall portion 23 is erected inside of the flange portion 22 in a side view. Further, the peripheral wall portion 23 has a stepped portion 23c on the side close to the opening 21a, and is shaped such that a lower portion of the peripheral wall portion 23 is offset inwardly at a boundary of the stepped portion 23c. Thus, on the side close to the flange portion 22, it is also possible to suitably house a component of relatively large diameter such as a coil inside the peripheral wall portion 23. Further, on the side close to the opening 21a, since the lower portion of the peripheral wall portion 23 is offset inwardly, it is possible to achieve space saving around the lower portion of the peripheral wall portion 23.

As shown in FIG. 3, the two connectors 24, 25 are arranged in parallel in the circumferential direction of the peripheral wall portion 23. The connectors 24, 25 are both tubular, and are integrally projected from the peripheral wall portion 23. To the connectors 24, 25, a cable (not shown) leading to the electromagnetic coil, and a cable (not shown) leading to the pressure sensors 7, 8 (see FIG. 1) are connected.

According to the present embodiment, as shown in FIG. 3, central axes X1, X2 of the two connectors 24, 25 are disposed so as to intersect with the straight edge portion 231 of the peripheral wall portion 23. Then, a projecting amount from the peripheral wall portion 23 of one connector 25 provided on the side close to the first cut portion 32 (on the lower side in the up-down direction) is smaller than that of the other connector 24. Also in shape when viewed from the side to which the cables are connected, the connector 25 is smaller than the connector 24.

Description will be returned to FIG. 2A. In addition to the oil supply ports 3a, 3b (see FIG. 1), the reservoir 3 includes the pipe connection port 3c and a connecting flange (not shown). The pipe connection port 3c is projected from a container body 3e for reserving the brake fluid. To the pipe connection port 3c, the hose which is extended from the main reservoir (not shown) is connected. The connecting flange is projected from a lower surface of the container body 3e, and is superimposed on the reservoir mounting portion 13 (see FIG. 2B), to be fixed to the connection portion of the base body 10 by a spring pin (not shown).

The stroke simulator 2, which is incorporated in the master cylinder device A1 (see FIG. 1) configured as described above, is configured such that constituent elements are incorporated in a main body portion 220a formed in the base body portion 10 (see FIG. 2A) as shown in FIG. 4 in the present embodiment. As shown in FIG. 4, the stroke simulator 2 according to the present embodiment includes a fluid leading port 220b which is connected to the branch hydraulic path 9e (see FIG. 1) via the normally closed type shut-off valve 6 (see FIG. 1), a cylinder portion 200 forming the second cylinder bore 11b of substantially cylindrical shape, a simulator piston 2a capable of being reciprocally displaced in the cylinder portion 200, the first return spring 2b of coil shape having a first elastic modulus $K_1$ (spring constant), and the second return spring 2c of coil shape having a second elastic modulus $K_2$ (spring constant) larger than the first elastic modulus $K_1$. The second cylinder bore 11b communicates with the branch hydraulic path 9e via the fluid leading port 220b. And, when a valve element of the normally closed type shut-off valve 6 (see FIG. 1) is switched to an open position, the brake fluid flows into or flows out of the second cylinder bore 11b via the fluid leading port 220b.

The cylinder portion 200 is configured such that a first cylinder 201 provided in the retracting direction (left direction in FIG. 4, hereinafter, this direction is defined as "rear") of the simulator piston 2a, and a second cylinder 202 provided in the advancing direction (right direction in FIG. 4, hereinafter, this direction is defined as "front") of the simulator piston 2a, are coaxially communicated with each other. Further, the simulator piston 2a is configured to be displaced (slide) in the front-rear direction in the first cylinder 201. And, a circumferential inner diameter of the first cylinder 201 is formed smaller than a circumferential inner diameter of the second cylinder 202.

In the present invention, the reaction force generating unit is configured to include the first return spring 2b and the second return spring 2c. Since the first return spring 2b and the second return spring 2c are provided in the second cylinder 202, the reaction force generating unit is housed in the second cylinder 202. Further, that the simulator piston 2a is displaced in the advancing direction means that it is displaced toward the second cylinder 202. Note that, an axial direction of the stroke simulator 2 is defined as the front-rear direction in the following. Further, the cylinder portion 200 (first cylinder 201, second cylinder 202) is filled with the brake fluid.

An annular groove 201a (a mounting grove) is formed in an inner wall of the first cylinder 201. In the annular groove 201a, for example, a cup seal 201b made of silicone rubber is fitted, and the cup seal 201b seals a gap formed between the simulator piston 2a and the inner wall of the first cylinder 201. Thus, by liquid-tightness which is exerted by the cup seal 201b, the second cylinder bore 11b is partitioned into the second cylinder 202 and the fluid leading port 220b side, so that the brake fluid flowing into the second cylinder bore 11b via the fluid leading port 220b does not leak out to the front side (the second cylinder 202 side) of the cup seal 201b. Then, with this configuration, the hydraulic pressure of the brake fluid flowing in from the fluid leading port 220b can be effectively applied to a pressing force of the simulator piston 2a. A configuration of the annular groove 201a and a configuration of the cup seal 201b will be described in detail later.

In the simulator piston 2a, a hollow portion 2a1 of substantially cylindrical shape which is open toward the rear (retraction direction) is formed. The hollow portion 2a1 contributes to weight reduction of the simulator piston 2a, and has a function of increasing storage amount of the brake fluid. A projecting portion is formed on a front end wall 2a2 of the simulator piston 2a. A first spring seat member 222 is fitted onto this projecting portion, and is fixed by a joining means such as press fitting or welding. In addition, a plurality of through-holes 2a3 is formed in the hollow portion 2a1. It is configured that the brake fluid taken into the first cylinder 201 from the fluid leading port 220*b* flows into the hollow portion 2*a*l by flowing through the through-holes 2*a*3.

The first spring seat member 222 is formed to have a bottomed cylinder portion (cylindrical portion 222*d*) which is closed at the front side thereof, and has a substantial cup shape. The first spring seat member 222 is fixed to the simulator piston 2*a* in a state in which an opening of the cylindrical portion 222*d* is closed by the front end wall 2*a*2. The first spring seat member 222 includes a flange portion 222*a* of donut disc shape which is hollowed at the central portion thereof, a side wall portion 222*b* which rises to the front side from an inner peripheral portion of the flange portion 222*a*, and a top wall portion 222*c* which covers a top portion of the side wall portion 222*b*. And, a front end side of the flange portion 222*a* receives a rear end side of the first return spring 2*b*. In addition, a reference numeral 222*d*1 denotes a through-hole which penetrates the cylindrical portion 222*d*. The through-hole 222*d*1 is formed for discharging the brake fluid and unnecessary air which accumulates inside the cylindrical portion 222*d*.

On the front side facing the first spring seat member 222, a second spring seat member 224 having a bottomed cylindrical portion (cylindrical portion 224*d*) is disposed. The second spring seat member 224 is a guide member for arranging the first return spring 2*b* and the second return spring 2*c* in series, and includes a flange portion 224*a* of donut disc shape which is hollowed at the central portion thereof, a side wall portion 224*b* which rises to the front side from an inner peripheral portion of the flange portion 224*a*, and a top wall portion 224*c* which covers a top portion of the side wall portion 224*b*. A front end side of the flange portion 224*a* receives a rear end side of the second return spring 2*c*. In addition, the bottomed cylindrical portion 224*d* is formed by the top wall portion 224*c* and the side wall portion 224*b* of the second spring seat member 224, and the first return spring 2*b* is housed inside the cylindrical portion 224*d*. That is, the top wall portion 224*c* forms a closed one end of the cylindrical portion 224*d*.

The size of the second spring seat member 224 is formed larger overall than the size of the first spring seat member 222. Specifically, the outer diameter of the cylindrical portion 222*d* of the first spring seat member 222 is formed smaller than the inner diameter of the cylindrical portion 224*d* of the second spring seat member 224, and the cylindrical portion 222*d* of the first spring seat member 222 is formed so as to enter the inside of the first return spring 2*b*. A rear end side of the top wall portion 224*c* of the second spring seat member 224 receives a front end side of the first return spring 2*b*.

On the front end side of the top wall portion 222*c* of the first spring seat member 222, a rubber bushing 226 is provided. The rubber bushing 226 is housed inside the first return spring 2*b*. Thus, it is possible to arrange the rubber bushing 226 in parallel to the first return spring 2*b*, thereby effectively utilizing a limited space. The rubber bushing 226 has a substantially cylindrical shape and is disposed such that the axial direction thereof is the front-rear direction. That is, the axial direction of the rubber bushing 226 coincides with the axial direction of the stroke simulator 2.

Further, a length between the front end side of the flange portion 222*a* of the first spring seat member 222 and the rear end side of the flange portion 224*a* of the second spring seat member 224, is denoted by a first interval $l_1$. On the other hand, a length between the top wall portion 222*c* of the first spring seat member 222 and an end portion (a first end portion 226*c*1) on the rear side of the rubber bushing 226 in a state in which an end portion (a second end portion 226*c*2) on the front side thereof comes into contact with the top wall portion 224*c* of the second spring seat member 224 by moving to the side of the top wall portion 224*c*, is denoted by a third interval $l_3$. The first interval $l_1$ is set greater than the third interval $l_3$. Thus, in a second interval $l_2$ obtained by subtracting the third interval $l_3$ from the first interval $l_1$, it is configured such that the rubber bushing 226 is crushed and elastically compressed in addition to elastic compression of the first return spring 2*b*. By setting the first to third intervals in this manner, the rubber bushing 226 generates a suitable reaction force (third reaction force F3) so that the reaction force applied to the simulator piston 2*a* can be smoothly switched at a switching point where the reaction force is switched from a reaction force (first reaction force F1) generated by the first return spring 2*b* to a reaction force (second reaction force F2) generated by the second return spring 2*c*.

With this configuration, by a depression operation of the brake pedal P (see FIG. 1) by the driver, the first spring seat member 222 moves (is displaced) to the second spring seat member 224 in the advancing direction by a length corresponding to the first interval $l_1$, and the first return spring 2*b* is elastically deformed (elastically compressed) by the length corresponding to the first interval $l_1$. In other words, the first return spring 2*b* is configured to be elastically deformed by setting the length corresponding to the first interval $l_1$ as a predetermined defined amount. The first interval $l_1$, the second interval $l_2$, and the third interval $l_3$ may be, for example, values which are appropriately determined as design values of the stroke simulator 2 based on the operation feeling and so on required for the vehicle brake system A (see FIG. 1).

Further, in a state in which the brake pedal P (see FIG. 1) is not depressed, if the second return spring 2*c* is in a state of being elastically compressed by $\Delta St2$ from a natural length thereof, the second reaction force F2 corresponding to "second elastic modulus $K_2 \times \Delta St2$" is generated in the second return spring 2*c* at this time. Further, when the first spring seat member 222 is displaced in the advancing direction until the front end side of the flange portion 222*a* of the first spring seat member 222 comes into contact with the rear end side of the flange portion 224*a* of the second spring seat member 224 by the depression operation of the brake pedal P by the driver, that is, when the first return spring 2*b* is elastically deformed (elastically compressed) by the predetermined defined amount, if the first return spring 2*b* is in a state of being elastically compressed by $\Delta St1$ from a natural length thereof, the first reaction force F1 corresponding to "first elastic modulus $K_1 \times \Delta St1$" is generated in the first return spring 2*b*. If the first elastic modulus $K_1$ is set to be smaller than the second elastic modulus $K_2$, it can be configured that firstly the first return spring 2*b* is elastically deformed (elastically compressed) by the predetermined defined amount, and then the second return spring 2*c* starts to be elastically deformed (elastically compressed).

In accordance with that the first return spring 2*b* is elastically compressed in response to the depression operation of the brake pedal P (see FIG. 1) by the driver, and the interval between the top wall portion 222*c* of the first spring seat member 222 and the top wall portion 224*c* of the second spring seat member 224 becomes shorter than a natural length of the rubber bushing 226 in the axial direction thereof, the rubber bushing 226 is elastically compressed in the axial direction thereof. Then, the rubber bushing 226 generates the third reaction force F3 depending on an elastic modulus (a third elastic modulus $K_3$).

On the front side facing the second spring seat member 224, an engaging member 228, which is mounted so as to enter the inside of the second return spring 2c, is disposed. The engaging member 228 extends in the radius direction at the front side thereof to form a flange portion 228a, and the flange portion 228a is fixed by being fitted into the second cylinder 202. Further, an engaging groove 228b is formed around the flange portion 228a, and an annular seal member 228c attached to the engaging groove 228b liquid-tightly seals a gap between the second cylinder 202 and the flange portion 228a. With this configuration, the brake fluid filled in the cylinder portion 200 (second cylinder 202) is prevented from leaking out from a gap between the second cylinder 202 and the flange portion 228a. In addition, the flange portion 228a receives the front end side of the second return spring 2c at the rear end side thereof.

On the front end side of the second cylinder 202, an annular groove 225a in which a retaining ring 225 is fitted is formed so as to circle the inside of the second cylinder 202. The engaging member 228 is disposed such that the front end side of the flange portion 228a is on the rear side of the annular groove 225a, and thus restricted from moving to the front direction (advancing direction) by the retaining ring 225 fitted in the annular groove 225a. With this configuration, the engaging member 228 is prevented from falling out of the second cylinder 202. Further, the engaging member 228 is urged in the front direction by the second return spring 2c from the rear end side of the flange portion 228a, and is fixed by the front end side of the flange portion 228a being pressed against the retaining ring 225.

In each of the top wall portions 222c, 224c of the first and second spring seat members 222, 224, through-holes 222e, 224e are open in the central portion thereof. In addition, the rubber bushing 226 is substantially formed with a cylindrical main body portion 226c having a hollow portion 226b of columnar shape. A rod member 221 is provided so as to penetrate each of the through-holes 222e, 224e and the hollow portion 226b of the rubber bushing 226. In the present embodiment, the diameter of the through-hole 224e is smaller than that of the through-hole 222e. Further, the rod member 221 has a stepped shape such that an outer diameter at the rear end side thereof is large to be inserted into the through-hole 222e and the hollow portion 226b of the rubber bush 226, and an outer diameter at the front end side thereof is small to be inserted into the through-hole 224e. The rear end side of the rod member 221 has a larger diameter than that of the through-hole 222e at the rear end side of the top wall portion 222c of the first spring seat member 222, to constitute a stopper. On the other hand, an end portion on the front end side of the rod member 221 has a larger diameter than that of the through-hole 224e at the front side thereof, to constitute a stopper. The stopper on the front end side of the rod member 221 can be, for example, easily formed by diameter expansion of the front end side of the rod member 221, which is inserted into the through-hole 224e from the rear side thereof, by swaging or the like.

Further, a top portion 228d of the engaging member 228 faces the top wall portion 224c of the second spring seat member 224, and is a stopper for defining a displacement in the advancing direction of the simulator piston 2a. The second spring seat member 224, which moves to the advancing direction in accordance with a displacement of the simulator piston 2a to the advancing direction (front direction), moves until the top wall portion 224c comes into contact with the top portion 228d of the engaging member 228. In other words, it is configured such that the simulator piston 2a can be displaced until the top wall portion 224c of the second spring seat member 224 comes into contact with the top portion 228d of the engaging member 228. Therefore, the displacement of the simulator piston 2a when the top wall portion 224c comes into contact with the top portion 228d is the maximum displacement in the advancing direction of the simulator piston 2a.

Note that, the simulator piston 2a is displaced in the advancing direction to a position corresponding to the brake hydraulic pressure generated in the master cylinder 1 (see FIG. 1) when the brake pedal P (see FIG. 1) is depressed to the maximum. Therefore, in the present embodiment, a position of the simulator piston 2a when the brake pedal P is depressed to the maximum, or when the simulator piston 2a is displaced toward the second cylinder 202 to the maximum, is a defined position. Such a defined position is preferably set in advance as a design value of the stroke simulator 2. In some cases, a position of maximum displacement in the advancing direction of the simulator piston 2a, where the top wall portion 224c comes into contact with the top portion 228d, is the defined position. In addition, in the top portion 228d, a recess for housing the end portion of the rod member 221 projecting from the top wall portion 224c of the second spring seat member 224 is formed. Further, the front side of the engaging member 228 may be configured to be appropriately hollowed for weight reduction.

In this manner, the front end side of the second return spring 2c is supported in contact with the main body portion 220a of the stroke simulator 2 via the engaging member 228, and the rear side thereof is supported in contact with the flange portion 224a of the second spring seat member 224. Further, the front end side of the first return spring 2b is supported in contact with the top wall portion 224c at the inside of the cylindrical portion 224d of the second spring seat member 224, and the rear end side thereof is supported in contact with the flange portion 222a of the first spring seat member 222. The first spring seat member 222 is fixed to the front end wall 2a2 of the simulator piston 2a. As a result, the simulator piston 2a is urged in the rear direction (retracting direction) by the first and second return springs 2b, 2c.

The first and second return springs 2b, 2c are arranged mechanically in series. The first and second elastic moduluses $K_1$, $K_2$ are set such that an increasing gradient of the reaction force (brake reaction force) applied to the simulator piston 2a in an initial stage of the depression of the brake pedal P (see FIG. 1) is small, and an increasing gradient of the reaction force applied to the simulator piston 2a in a later stage of the depression of the brake pedal P is large. This is based on a design concept that does not allow the driver to be aware of whether the conventional brake system is mounted or the by-wire type brake system is mounted, by making the brake reaction force for the depression operation amount of the brake pedal P be equivalent to the brake reaction force in the conventional brake system which is operated by the brake fluid.

Figure 5A:
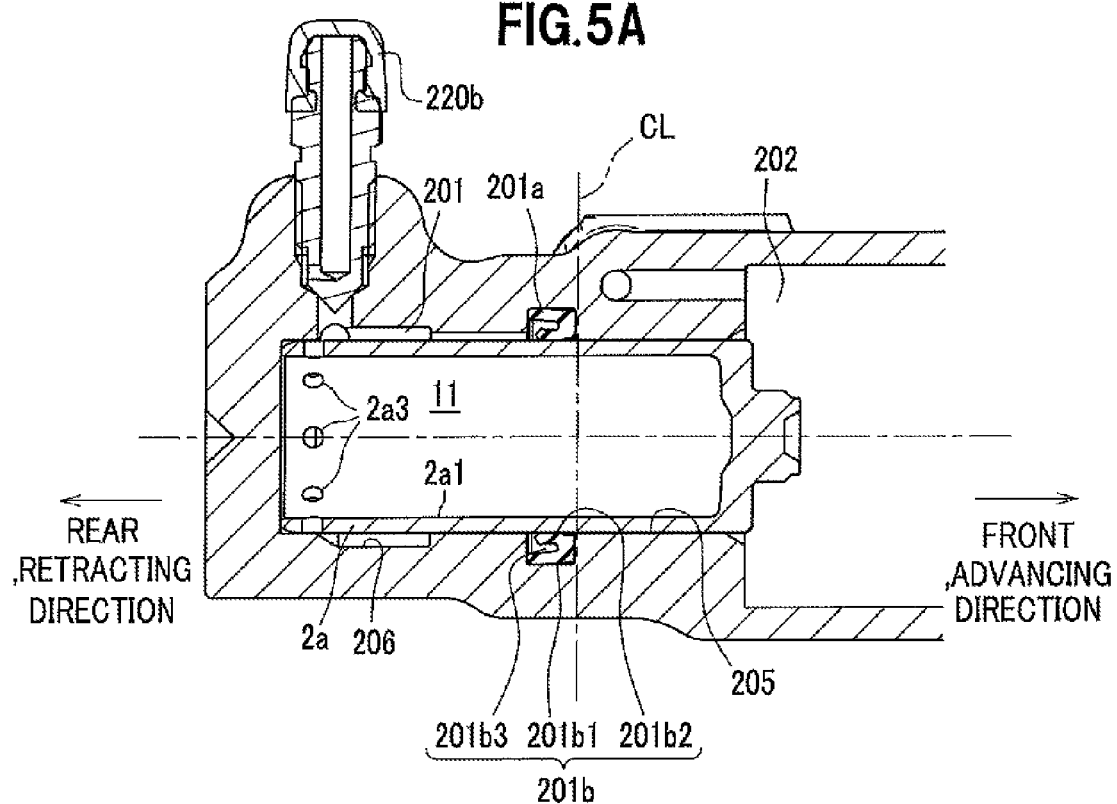
FIG. 5A is a sectional view showing a sliding surface and a non-sliding contact surface.

In the stroke simulator 2 configured in this manner, the simulator piston 2a is displaced while sliding on the inner wall of the first cylinder 201, so that the gap between the simulator piston 2a and the inner wall of the first cylinder 201 is sealed with the cup seal 201b as described above. As shown in FIG. 5A, on the inner wall of the first cylinder 201, a sliding surface 205 on which the simulator piston 2a slides with respect to the first cylinder 201 and a non-sliding contact surface 206 which the simulator piston 2a is not in sliding contact with are formed to face the simulator piston 2a. The sliding surface 205 is formed substantially equal to the outer diameter of the simulator piston 2a. Further, the non-sliding contact surface 206 is formed by making the inner diameter of the first cylinder 201 larger than the outer diameter of the simulator piston 2a in the rear along the axial direction of the sliding surface 205.

By providing the non-sliding contact surface 206 in the rear of the sliding surface 205 of the inner wall of the first cylinder 201 in this manner, the length in the front-rear direction (the length in the axial direction) of the sliding surface 205 can be appropriately made shorter than the length in the front-rear direction (the length in the axial direction) of the simulator piston 2a. Then, by adjusting the length in the axial direction of the sliding surface 205, it is possible to adjust a sliding friction when the simulator piston 2a is displaced while sliding on the sliding surface 205. Note that, the length in the axial direction of the sliding surface 205 is preferably appropriately determined in accordance with responsiveness etc. required for the simulator piston 2a.

Further, in the present embodiment, in a range in which the simulator piston 2a is displaced to the defined position in the advancing direction from the initial position, the entire range of the length in the axial direction of the sliding surface 205 is configured to face the simulator piston 2a. That is, when the simulator piston 2 is displaced to the defined position in the advancing direction, a rear side end portion of the simulator piston 2a is preferably configured to be located at the non-sliding contact surface 206. Note that, as described above, the defined position in the advancing direction of the simulator piston 2a is the position of the simulator piston 2a when the brake pedal P (see FIG. 1) is depressed to the maximum, and is the position (displacement amount of the simulator piston 2a) set in advance as the design value of the stroke simulator 2 (see FIG. 1). In addition, the initial position is a position of the simulator piston 2a when the hydraulic pressure is not generated inside the cylinder 200, and the simulator piston 2a is pushed back in the retracting direction by the first return spring 2b and the second return spring 2c.

In the present embodiment, the mounting groove (annular groove 201a) in which the cup seal 201b is fitted is formed. The annular groove 201a is formed in the peripheral direction of the inner wall of the first cylinder 201 in the middle of the length in the axial direction (in the axial direction center CL) of the sliding surface 205. With this configuration, the cup seal 201b is disposed in the axial direction center CL of the sliding surface 205, and the simulator piston 2a is in contact with the cup seal 201 in the axial direction center CL of the sliding surface 205. In the present embodiment, as far as a part of the cup seal 201b is disposed in the axial direction center CL of the sliding surface 205, it is regarded as a state in which the cup seal 201b is disposed in the axial direction center CL of the sliding surface 205.

Since a small gap is formed between the simulator piston 2a and the sliding surface 205, if the simulator piston 2a moves to the direction of the small gap, it is inclined with respect to the sliding surface 205. However, if the cup seal 201b is disposed in the axial direction center CL of the sliding surface 205, it is possible to suppress a movement of the simulator piston 2a to the direction of the gap by the cup seal 201b, thereby preventing the simulator piston 2a from being inclined. Hereinafter, the movement of the simulator piston 2a to the direction of the gap is referred to as a movement to the inclination direction.

For example, when the simulator piston 2a is displaced in the advancing direction, an amount of projection of the cylinder 202 (see FIG. 4) to the simulator piston 2a from the sliding surface 205 is increased, and a distance to the sliding surface 205 from the front end wall 2a2 (see FIG. 4) of the simulator piston 2a is increased. Therefore, the simulator piston 2a is easily shaken to easily move to the inclination direction, for example, by a force applied to the front end wall 2a2. In other words, the simulator piston 2a which is displaced in the advancing direction is in a state of being easily inclined with respect to the sliding surface 205.

Therefore, in the present embodiment, as shown in FIG. 5A, the cup seal 201b is configured to be mounted in the axial direction center CL of the sliding surface 205. With this configuration, even if the simulator piston 2a is in a state of being displaced in the advancing direction, the cup seal 201b can suppress the movement in the inclination direction of the simulator piston 2a at the axial direction center CL of the sliding surface 205, thereby suitably preventing an inclination of the simulator piston 2a. Further, in the range in which the simulator piston 2a is displaced to the defined position in the advancing direction from the initial position, the cup seal 201b is mounted on the sliding surface 205 facing the simulator piston 2a in the entire range, and thus the cup seal 201b does not move from the axial direction center CL of the sliding surface 205 even if the simulator piston 2a is displaced. Therefore, the cup seal 201b can always suppress the movement in the inclination direction of the simulator piston 2a in the axial direction center CL of the sliding surface even if the simulator piston 2a is displaced, and the cup seal 201b can effectively prevent the inclination of the simulator piston 2a without being affected by the displacement of the simulator piston 2a. In other words, the simulator piston 2a, which is displaced in the advancing direction to be in the state of being easily inclined, can be effectively prevented from being inclined by the cup seal 201b.

If the cup seal 201b is, for example, disposed in a vicinity of an end portion of the sliding surface 205, the sliding surface is long on the side where the cup seal 201b is not disposed, and thus the movement in the inclination direction of the simulator piston 2a cannot be suppressed in this case. Because of this, a part which cannot suppress the movement to the inclination direction becomes longer, and the simulator piston 2a is easily inclined. When the simulator piston 2a is inclined, the sliding friction with the sliding surface 205 is increased, and an operating performance of the simulator piston 2a is changed. In contrast, the cup seal 201b according to the present embodiment does not move from the axial direction center CL of the sliding surface 205. Therefore, even if the simulator piston 2a is in the state of being displaced in the advancing direction, as described above, it is possible to suitably prevent the inclination of the simulator piston 2a by the cup seal 201b, thereby preventing a reduction of the operating performance of the simulator piston 2a.

Figure 5B:
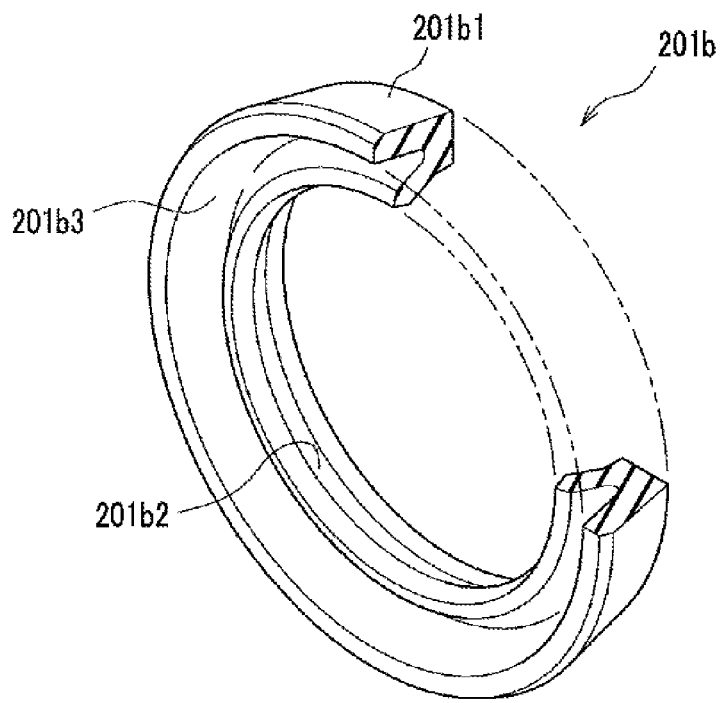
FIG. 5B is a perspective view showing a shape of a cup seal.

Further, as shown in FIG. 5B, the cup seal 201b according to the present embodiment has an annular shape. An outer peripheral portion 201b1 is fitted into the annular groove 201a formed in the first cylinder 201, and an inner peripheral portion 201b2 is in contact (sliding contact) with the outer peripheral surface of the simulator piston 2a. Further, between the outer peripheral portion 201b1 and the inner peripheral portion 201b2, a groove portion 201b3 in the peripheral direction is formed.

The cup seal 201b is fitted into the cylinder 201 (annular groove 201a) so that an opening of the groove portion 201b3 faces the rear direction. With this configuration, when the hydraulic pressure is generated inside the cylinder 200 (that is, when the simulator piston 2a is displaced to a direction of pressing the first return spring 2b), the inner peripheral portion 201b2 and the groove portion 201b3 are open, to be deformed such that a rear side end portion of the inner peripheral portion 201b2 is sent out toward the front direction. Because of this, a liquid-tightness between the inner peripheral surface portion 201b2 and the simulator piston 2a to be displaced is maintained, and a high liquid-tightness of the cup seal 201b is ensured.

The cup seal 201b according to the present embodiment is preferably mounted on the first cylinder 201 such that the inner peripheral portion 201b2 which is deformed is located in the axial direction center CL of the sliding surface 205, when the simulator piston 2a is displaced to the defined position in the advancing direction (front direction) and the inner peripheral portion 201b2 is sent out to the front direction to be deformed. With this configuration, the simulator piston 2a which is displaced in the advancing direction (front direction) is in contact with the inner peripheral portion 201b2 of the cup seal 201b in the axial direction center CL of the sliding surface 205.

As shown in FIG. 5A, in a case where the cup seal 201b is mounted so as not to be deformed when the simulator piston 2a is in a state of being displaced to the rear side to the maximum by an urging force of the first return spring 2b, when the simulator piston 2a is displaced in the advancing direction, the cup seal 201b is deformed such that the inner peripheral portion 201b2 rises by being pushed out toward the advancing direction (front direction).

Figure 6:
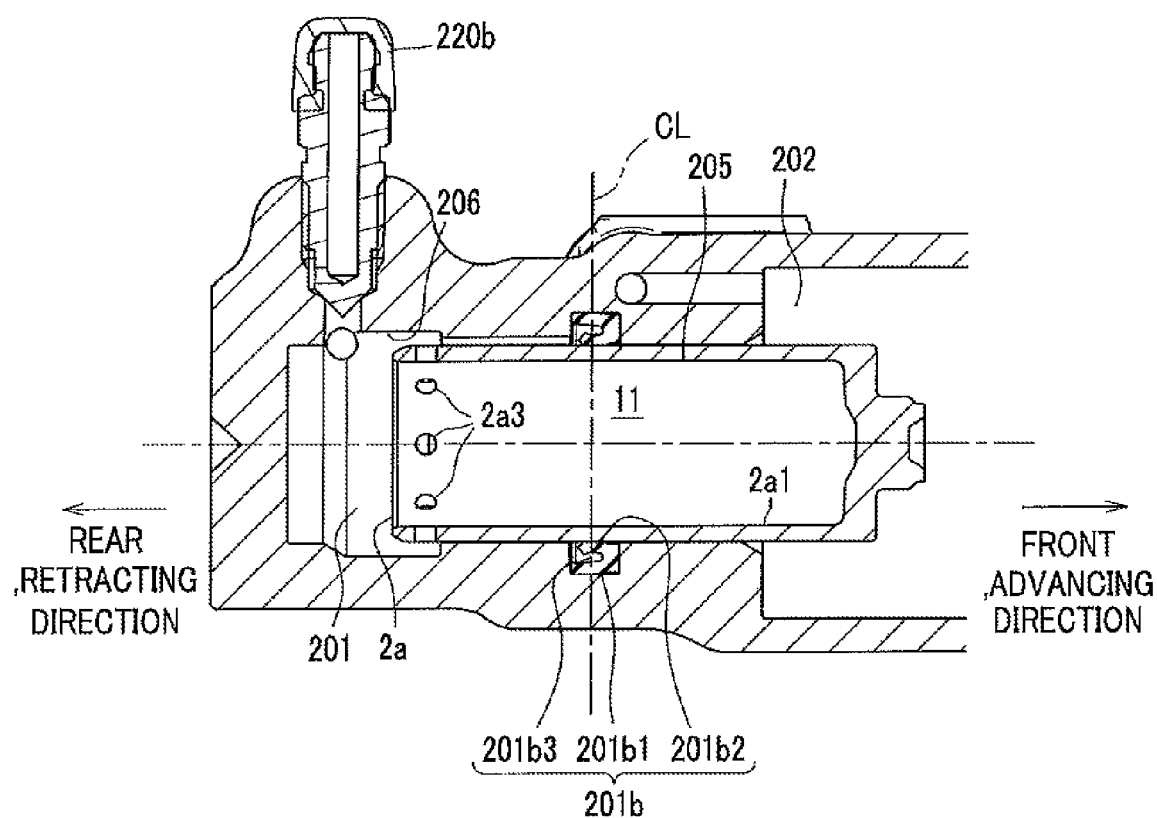
FIG. 6 is a diagram showing a state in which the cup seal comes into contact with a simulator piston at an axial center of the sliding surface, when the simulator piston is displaced to a defined position.

Therefore, as shown in FIG. 6, the cup seal 201b is preferably configured to be mounted such that a position where the inner peripheral portion 201b2, which is deformed by being dragged by the simulator piston 2a, is in contact with the simulator piston 2a is the axial direction center CL of the sliding surface 205, when the simulator piston 2a is displaced to the defined position in the advancing direction.

With this configuration, when the cup seal 201b is deformed in accordance with the displacement to the defined position in the advancing direction of the simulator piston 2a, the cup seal 201b is in contact with the simulator piston 2a in the axial direction center CL of the sliding surface 205. Therefore, the movement to the inclination direction of the simulator piston 2a in the axial direction center CL of the sliding surface 205 is suppressed, and the inclination of the simulator piston 2a can be suitably prevented.

As described above, the stroke simulator 2 (see FIG. 4) according to the present embodiment is configured such that the cup seal 201b (see FIG. 5A) is mounted in the axial direction center CL of the sliding surface 205 (see FIG. 5A) of the first cylinder 201. With this configuration, the simulator piston 2a is in contact with the cup seal 201b (see FIG. 5A) in the axial direction center CL of the sliding surface 205 regardless of the state of the displacement thereof. Therefore, it is possible to suitably suppress the movement in the inclination direction of the simulator piston 2a in the axial direction center CL of the sliding surface 205, thereby preventing the inclination of the simulator piston 2a. Further, by providing the cup seal 201b in the axial direction center CL of the sliding surface 205, the inclination of the simulator piston 2a, which is displaced in the advancing direction, can be suitably prevented.

Further, as shown in FIG. 6, it may be configured that a position where the inner peripheral portion 201b2 of the cup seal 201b, which is deformed, is in contact with the simulator piston 2a is the axial direction center CL of the sliding surface 205, when the simulator piston 2a is displaced in the advancing direction to a predetermined defined position. With this configuration, the inclination of the simulator piston 2a, which is in a state of being easily inclined by being displaced in the advancing direction, can be more effectively prevented by the cup seal 201b. Note that, the configuration for sealing the gap formed between the simulator piston 2a and the inner wall of the first cylinder 201 is not limited to the cup seal 201b. For example, it may be configured that an O-ring or the like is provided instead of the cup seal 201b.

REFERENCE SIGNS LIST

1: master cylinder (hydraulic pressure generating unit)
2: stroke simulator
2a: simulator piston
2b: first return spring (reaction force generating unit)
2c: second return spring (reaction force generating unit)
224: second spring seat member
224b: side wall portion
224c: top wall portion (closed one end)
224d: cylindrical portion
224d1: flow path
224d2: opening portion
226: rubber bushing
200: cylinder portion
201: first cylinder
201b: cup seal
201b1: outer peripheral portion
201b2: inner peripheral portion
202: second cylinder
205: sliding surface
CL: axial direction center
P: brake pedal (brake operating element)

The invention claimed is:
1. A stroke simulator comprising:
a first cylinder having a sliding surface formed therein;
a second cylinder coaxially formed in communication with the first cylinder;
a simulator piston disposed in the first cylinder, said simulator piston being displaced by sliding on the sliding surface in response to a hydraulic pressure which is generated by a hydraulic pressure generating unit due to an operation of a brake operating element by a driver; and
a reaction force generating unit disposed in the second cylinder, said reaction force generating unit being connected with said simulator piston, and including a pair of spring members arranged coaxially;
wherein:
the first cylinder has a mounting groove formed therein substantially at a middle portion in an axial direction thereof;
a cup seal is fitted in the mounting groove for sealing a gap formed between the simulator piston and the sliding surface in the middle in the axial direction of the sliding surface so as to maintain alignment of the simulator piston with respect the axial direction of the first cylinder;
the simulator piston is in contact with the cup seal at the middle portion in the axial direction of the sliding surface regardless of state of the displacement thereof;
the second cylinder further includes a first spring seat member having a cup-shaped cylinder portion closed at the front side thereof; and
the first spring seat member is fixed to the simulator piston such that an opening of the cup-shaped cylindrical portion is closed by a front end wall of the simulator piston and a portion of the front end wall of the simulator piston is disposed in the cup-shaped cylindrical portion.

* * * * *